(12) United States Patent  
Cheng et al.

(10) Patent No.: US 8,419,310 B2  
(45) Date of Patent: Apr. 16, 2013

(54) MECHANICAL DOUBLE JOINT SYSTEM

(75) Inventors: Gang Cheng, Shenzhen (CN); Jian-Jun Li, Shenzhen (CN); Te-Sheng Jan, New Taipei (TW); Yu-Tao Chen, New Taipei (TW); Chun-Che Yen, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/241,178

(22) Filed: Sep. 22, 2011

(65) Prior Publication Data

US 2012/0014743 A1    Jan. 19, 2012

Related U.S. Application Data

(62) Division of application No. 11/968,655, filed on Jan. 3, 2008, now Pat. No. 8,047,738.

(30) Foreign Application Priority Data

Aug. 31, 2007   (CN) .......................... 2007 1 0201564

(51) Int. Cl.  
*F16C 11/00* (2006.01)

(52) U.S. Cl.  
USPC ............................................ 403/92; 403/94

(58) Field of Classification Search .......... 403/92, 403/94, 96–98, 103, 105, 209, 329, 371, 403/DIG. 14; 464/37; 248/288.31, 388.51, 248/479, 481–484  
See application file for complete search history.

(56) References Cited

U.S. PATENT DOCUMENTS

| | | | | | |
|---|---|---|---|---|---|
| 2,129,933 | A | * | 9/1938 | Hueglin | 416/244 R |
| 4,006,787 | A | * | 2/1977 | Rumpp et al. | 173/132 |
| 4,614,452 | A | * | 9/1986 | Wang | 403/27 |
| 4,700,919 | A | * | 10/1987 | Saunders, IV | 248/288.31 |
| 4,878,880 | A | * | 11/1989 | Williams | 464/37 |
| 4,968,280 | A | * | 11/1990 | Kelley | 446/330 |
| 5,000,721 | A | * | 3/1991 | Williams | 464/37 |
| 5,016,740 | A | * | 5/1991 | Ito et al. | 192/38 |
| 5,150,851 | A | * | 9/1992 | Manusch et al. | 242/599.4 |
| 5,265,969 | A | * | 11/1993 | Chuang | 403/94 |
| 5,429,481 | A | * | 7/1995 | Liu | 416/246 |
| 5,515,744 | A | * | 5/1996 | Liao | 74/551.3 |
| 5,601,491 | A | * | 2/1997 | Chan et al. | 464/37 |
| 5,617,592 | A | * | 4/1997 | Cheng | 403/94 |
| 5,709,360 | A | * | 1/1998 | Rosen | 403/97 |
| 6,079,949 | A | * | 6/2000 | Litvin | 403/94 |
| 6,149,491 | A | * | 11/2000 | Arad et al. | 446/355 |
| 6,206,933 | B1 | * | 3/2001 | Shorter et al. | 623/44 |
| 6,220,415 | B1 | * | 4/2001 | Cosenza | 464/37 |
| 6,317,930 | B1 | * | 11/2001 | Hung | 403/94 |

(Continued)

*Primary Examiner* — Victor MacArthur  
(74) *Attorney, Agent, or Firm* — Altis Law Group, Inc.

(57) ABSTRACT

An exemplary mechanical joint system includes a joint, an arm, a plurality of teeth, an engaging member, and at least one latching member. The joint defines a pivot hole and a joint receiving hole communicating with the pivot hole. The arm is rotatable relative to the joint and includes a pivot portion and a pivot hole defined in the pivot portion. The pivot portion is received in the joint receiving hole. The engaging member includes a pivot shaft and a fixing member fixed relative to the pivot shaft. The plurality of teeth extends from an outer surface of the shaft portion of the pivot shaft. The latching member is mounted in the pivot hole of the pivot portion of the arm for engaging with the teeth.

7 Claims, 10 Drawing Sheets

U.S. PATENT DOCUMENTS

| | | | |
|---|---|---|---|
| 6,948,197 B1 * | 9/2005 | Chen | 403/97 |
| 6,993,998 B1 * | 2/2006 | Kao et al. | 403/97 |
| 7,367,891 B2 * | 5/2008 | Bae | 464/37 |
| 7,591,604 B2 * | 9/2009 | Roberts | 403/96 |
| 2006/0025224 A1 * | 2/2006 | Saeki et al. | 464/37 |
| 2006/0096770 A1 * | 5/2006 | Roberts | 403/84 |
| 2006/0165476 A1 * | 7/2006 | Lin | 403/94 |
| 2009/0294608 A1 * | 12/2009 | Brassard | 248/205.5 |

\* cited by examiner

MECHANICAL DOUBLE JOINT SYSTEM

CROSS-REFERENCE TO RELATED APPLICATION

The present application is a divisional application of U.S. patent application Ser. No. 11/968,655, filed on Jan. 3, 2008, which claims all benefits accruing under 35 U.S.C. §119 from CN 200710201564.1, filed on Aug. 31, 2007, the contents of which are hereby incorporated by reference.

BACKGROUND OF THE INVENTION

1. Field of the Invention

The present invention generally relates to rotatable joints, and more particularly, to a mechanical double joint system.

2. Discussion of the Related Art

Rotatable joints accommodates movement for arms of mechanical devices. As such, a mechanical device, having an arm designed for movement, includes a rotatable joint. The rotatable joint may join an arm or an actuating portion to a supporting portion (generally the body) of the mechanical device. In other words, the actuating portion is attached to the supporting portion by the rotatable joint. A typical actuating portion includes a base fixed to the supporting portion, a movable member fixed to the actuating portion, and a pivot shaft for connecting the base and the movable member. A pivot hole is defined in the base, and an end of the pivot shaft is rotatably engaged in the pivot hole. The other end of the pivot shaft is rotatably connected to the movable member by a pin. Thus, the movable member not only can rotate together with the pivot shaft relative to the base, but can also rotate relative to the pivot shaft.

Due to frictional force, wear and tear of usage, the pivot shaft and the pin of the rotatable joint may become worn out, thus the rotatable joint may become unstable and control of the actuating portion may suffer.

Therefore, a mechanical double joint system that is less likely to be worn out, and to be stable over the long term, is desired.

SUMMARY

In one aspect, a mechanical joint system includes a joint, an arm, a plurality of teeth, and a grasping element. The arm is rotatable relative to the joint. A pivot hole therein is defined in the arm. The teeth are formed on an inner surface adjacent to an end of the pivot hole. The engaging member is fixed to the joint. The engaging member includes a prong for engaging with the teeth.

In another aspect, a mechanical joint system includes a joint, an arm, a grasping element, and a latching element. The arm is rotatable relative to the joint. A pivot hole is defined in the arm. The engaging member is fixed to the joint. The engaging member includes a plurality of teeth extending from outer surface thereof. The latching member is mounted in the pivot hole for engaging with the teeth.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present mechanical double joint system. Moreover, in the drawings, like reference numerals designate corresponding parts throughout the several views, and all the views are schematic.

DETAILED DESCRIPTION OF THE EMBODIMENTS

Reference will now be made to the drawings to describe preferred embodiments of the present mechanical double joint system in detail.

Figure 1:
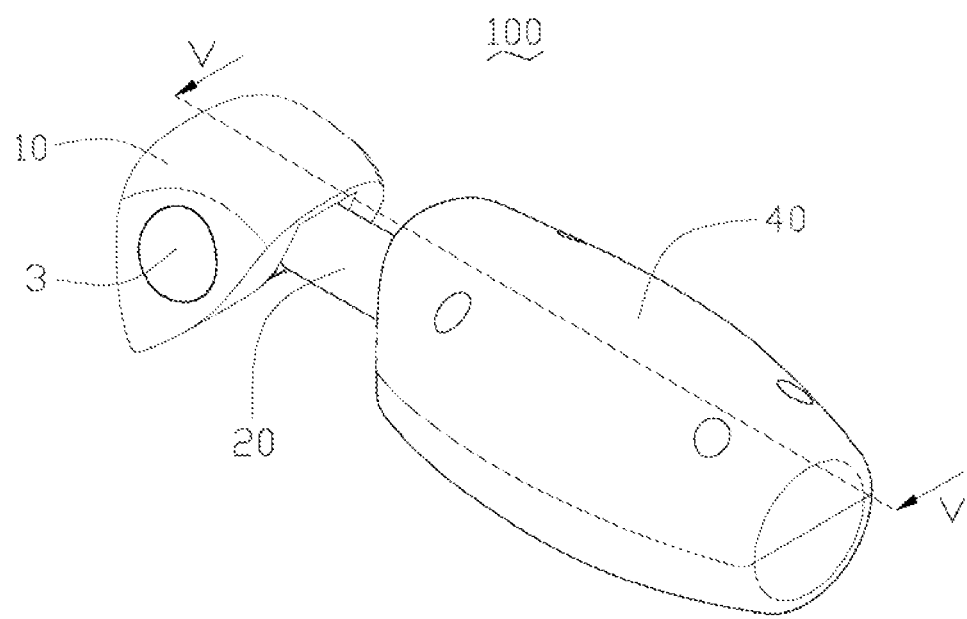
FIG. 1 is an assembled, isometric view of a mechanical double joint system in accordance with a first embodiment of the present invention.

Referring to FIG. 1, a mechanical double joint system 100 in accordance with a first embodiment is shown. The mechanical double joint system 100 includes a first joint 10, an arm 20, an engaging member 3, and a second joint 40. The arm 20 is rotatable relative to the first joint 10. The second joint 40 is rotatable relative to the arm 20.

Figure 2:
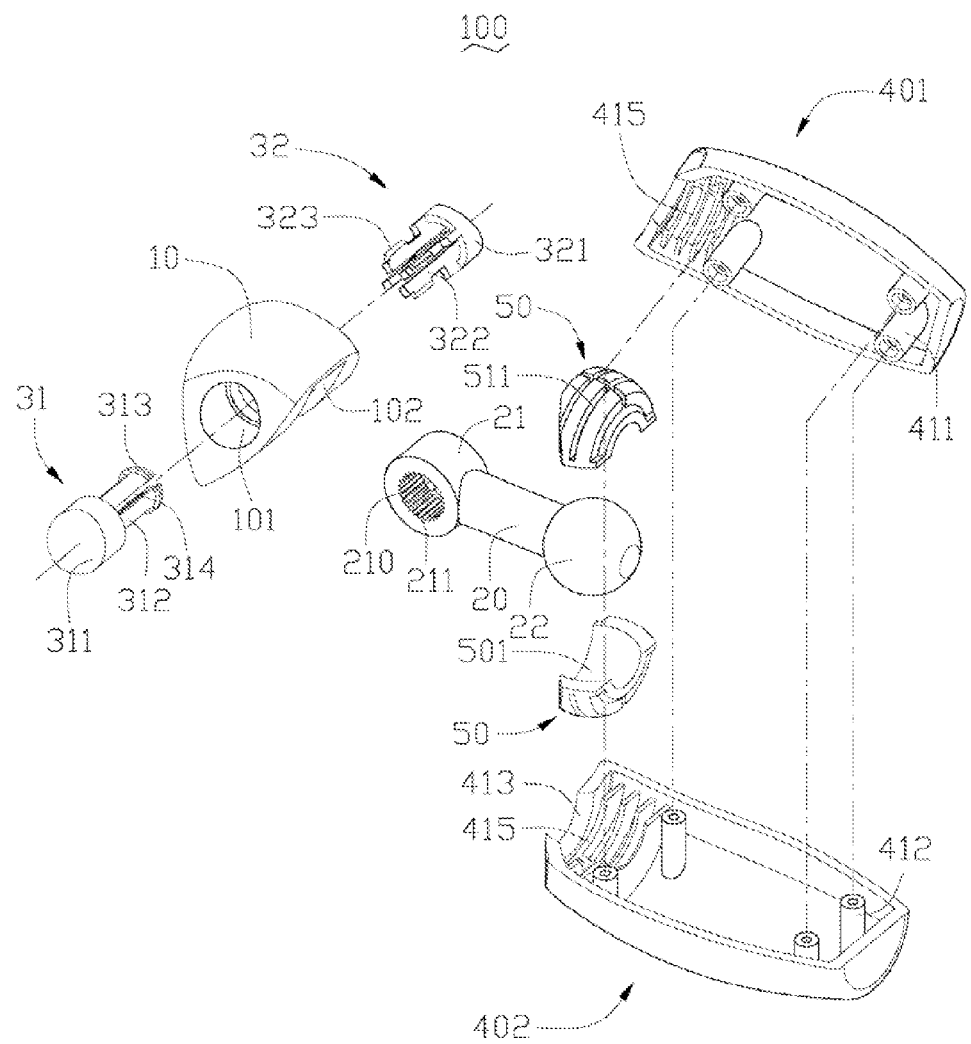
FIG. 2 is an exploded, isometric view of the mechanical double joint system shown in FIG. 1.
Figure 3:
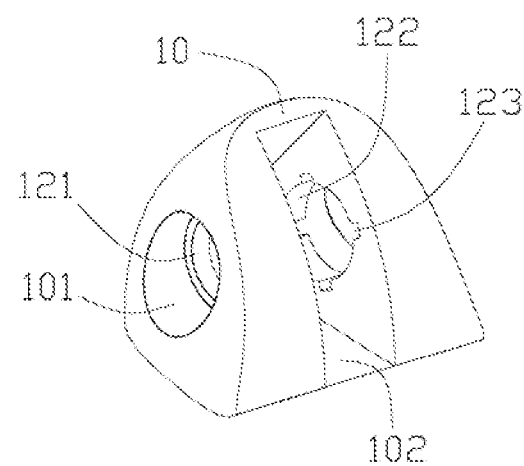
FIG. 3 is an isometric view of a first joint of the mechanical double joint system shown in FIG. 1.
Figure 4:
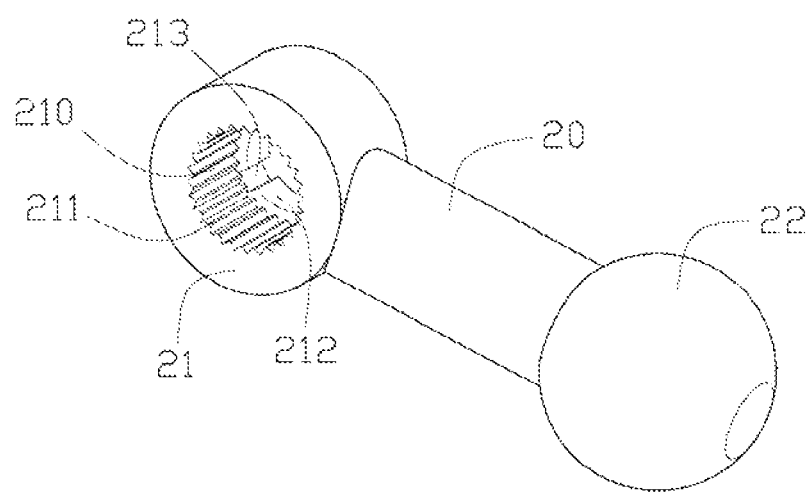
FIG. 4 is an isometric view of an arm of the mechanical double joint system shown in FIG. 1.

Referring also to FIGS. 2 through 4, a pivot hole 101 and a first joint receiving hole 102 are defined in the first joint 10. The pivot hole 101 communicates with the first joint receiving hole 102. The first joint 10 further includes a first flange portion 121 and a second flange portion 122 formed in the pivot hole 101. The first flange portion 121 is adjacent to a first sidewall in the first joint receiving hole 102 and the second flange portion 122 is adjacent to a second opposite sidewall in the first joint receiving hole 102. A plurality of locking grooves 123 are defined in the second flange portion 122.

The arm 20 is substantially a shaft including a pivot portion 21 disposed at an end thereof and a ball 22 disposed at another end thereof. The pivot portion 21 is substantially a cylinder with a pivot hole 210 defined through a center thereof. The pivot portion 21 further includes a plurality of teeth 211 formed on an inner surface adjacent to an end of the pivot hole 210. An engaging flange 212 is protruded out from an inner surface adjacent to another end of the pivot hole 210. A plurality of shaft positioning prong grooves 213 are defined in the engaging flange 212. The ball 22 is configured for rotatably engaging in the second joint 40.

Each of the teeth 211 is preferred to be an elongated protrusion. A cross-section of elongated protrusion is preferred to be V-shaped or semicircular.

The engaging member 3 includes a pivot shaft 31 and a pivot shaft positioner 32. The pivot shaft 31 includes a shaft head 311 and a shaft portion 312 extending from an end of the shaft head 311. The shaft head 311 has a size corresponding to that of the pivot hole 101 of the first joint 10. A length of the shaft head 311 is equal to a length of a portion of the pivot hole 101 between an inner end surface of the first flange portion 121 and an outer end surface of the first joint 10. Thus, when the shaft head 311 is received in the pivot hole 101, an outer end surface of the shaft head 311 and the outer end surface of the first joint 10 are substantially coplanar. A flange 313 is formed at the end of the shaft portion 312. The shaft portion 312 defines four first joint receiving holes 314 therein along a direction parallel to an axis of the shaft portion 312. The pivot shaft positioner 32 includes a shaft head 321 and four latching rims 322. The latching rims 322 are configured to engage in the first joint receiving holes 314 of the pivot shaft 31 correspondingly. The shaft head 321 has a size corresponding to that of the pivot hole 101 of the first joint 10. A length of the shaft head 321 is equal to a length of a portion of the pivot hole 101 between an inner end surface of the second flange portion 122 and an outer end surface of the first joint 10. Thus, when the shaft head 321 is received in the pivot hole 101, an outer end surface of the shaft head 321 and the outer end surface of the first joint 10 are substantially coplanar. Each of the latching rims 322 includes a prong 323 formed at an end thereof. The pivot shaft 31 and the pivot shaft positioner 32 are deformable along a radial direction of the pivot shaft 31 and the pivot shaft positioner 32.

Each of the prongs 323 is preferred to be an elongated protrusion. A cross-section of the prongs 323 is preferred to be V-shaped or semicircular.

It should be understood that, the number of the first joint receiving holes 314 and the number of the latching rims 322 are not limited to four. The number of the first joint receiving holes 314 and the number of the latching rims 322 are preferred to be at least two. The first joint receiving holes 314 are evenly defined on the pivot shaft 31. The latching rims 322 are evenly formed on the pivot shaft positioner 32.

The second joint 40 includes a first half 401 and a second half 402 that collectively form the second joint 40. The first half 401 includes a plurality of cylindrical poles perpendicularly extending from an inner surface thereof. Each of the cylindrical poles defines a circular hole 411 therein. The second half 402 includes a plurality of latching poles 412 perpendicularly extending from an inner surface thereof. Each of the latching poles 412 has a size corresponding to one of the circular holes 411 of the cylindrical poles, thus the first half 401 and the second half 402 can be held together by inserting the latching poles 412 into the circular holes 411 correspondingly. A radius of each latching pole 412 is the same as or a little larger than a radius of each circular hole 411, thus each of the latching poles 412 is able to tightly engage in one of the circular hole 411. The second joint 40 defines a restricting hole 413 at an end thereof. Half of the restricting hole 413 is defined in an end of the first half 401 and the other half of the restricting hole 413 is defined in a corresponding end of the second half 402. The first half 401 and the second half 402 both include a socket holder 415 having a plurality of fixing pieces extending from an inner surface thereof.

The mechanical double joint system 100 further includes a socket having a first half and a second half sockets 50. Each of the first and second half sockets 50 includes a concave inner surface 501. The concave inner surface 501 is substantially spherical surface. The concave inner surfaces 501 of the first and second half sockets 50 are oriented symmetrically opposite to each other for cooperatively clamping the ball 22 of the arm 20. Each of the first and second half sockets 50 defines a plurality of latching grooves 511 at an outer surface thereof for engaging with the fixing pieces of the socket holder 415 of the second joint 40. The first and second half sockets 50 can be fixed to the first half 401 and the second half 402 correspondingly by inserting the first and second half sockets 50 into the socket holder 415.

In an alternative embodiment, One of the first and second half sockets 50 is welded to the first half 401 and the other of the first and second half sockets 50 is welded to the second half 402. It should be understood that, the first and second half sockets 50 can also be made integrally with the first half 401 and the second half 402 correspondingly.

To assemble the mechanical double joint system 100, the pivot portion 21 of the arm 20 is received in the first joint receiving hole 102 of the first joint 10. The pivot hole 210 of the arm 20 and the pivot hole 101 of the first joint 10 are aligned along a same axis.

The pivot shaft 31 of the engaging member 3 is inserted into the pivot hole 101 of the first joint 10 and the pivot hole 210 of the arm 20 from such end of the pivot hole 101 which has the first flange portion 121. The flange 313 of the pivot shaft 31 is compressed along a radial direction of the flange 313 by the engaging flange 212 when extends through the engaging flange 212. After the whole flange 313 extending through the engaging flange 212, the flange 313 rebound to its original position, thereby preventing the pivot shaft 31 detaching from the pivot hole 101 of the first joint 10.

Each of the first joint receiving holes 314 of the pivot shaft 31 aims at one corresponding shaft-positioning prong groove 213 of the engaging flange 212 which aims at one corresponding locking groove 123 of the second flange portion 122. The pivot shaft positioner 32 is inserted into the pivot hole 101 of the first joint 10 and the pivot hole 210 of the arm 20 from such end of the pivot hole 101 which has the second flange portion 122. The latching rims 322 of the pivot shaft positioner 32 run through the locking grooves 123 of the second flange portion 122 and the shaft-positioning prong groove 213 of the engaging flange 212, and are inserted into the first joint receiving holes 314 of the pivot shaft 31 correspondingly. The prongs 323 of the latching rims 322 extend out of the first joint receiving holes 314 of the pivot shaft 31 for engaging with the teeth 211 of the arm 20. The arm 20 are rotated so that each of the shaft-positioning prong grooves 213 of the engaging flange 212 does not aim at one corresponding prong 323 of each latching rim 322, thereby preventing the pivot shaft positioner 32 detaching from the first joint 10.

The first and second half sockets 50 are fixed to the first half 401 and the second half 402 correspondingly by inserting the first and second half sockets 50 into the socket holder s 415. The concave inner surfaces 501 of the first and second half sockets 50 are oriented symmetrically opposite to each other and cooperatively clamp the ball 22 of the arm 20. The first half 401 is attached to the second half 402 by inserting the latching poles 412 into the circular holes 411 correspondingly to collectively form the second joint 40. Then, the mechanical double joint system 100 is assembled.

Figure 5:
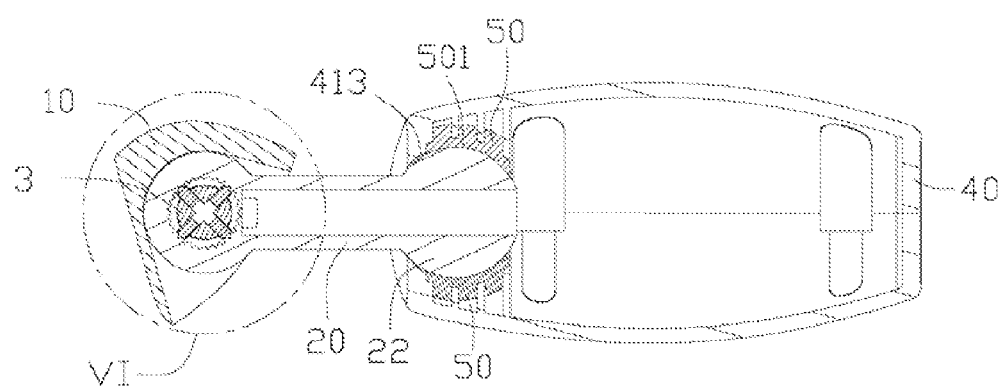
FIG. 5 is a cross-sectional view of the mechanical double joint system shown in FIG. 1, taken along line V-V thereof.
Figure 6:
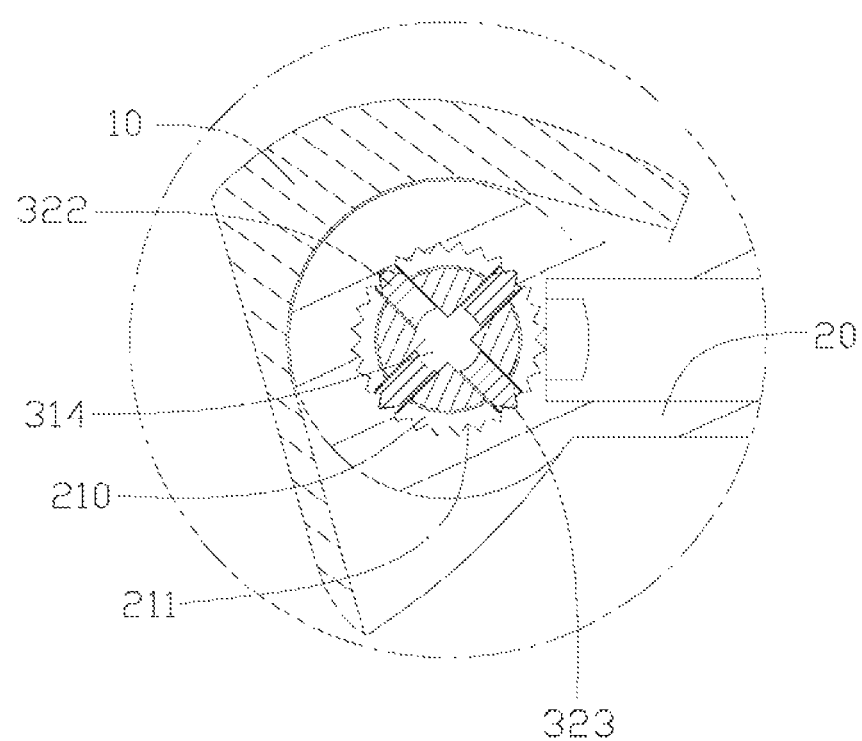
FIG. 6 is an enlarged view of an encircled portion VI shown in FIG. 1.

Referring also to FIGS. 5 and 6, to use the mechanical double joint system 100, the arm 20 is rotatable relative to the engaging member 3. The engaging member 3 is fixed relative to the first joint 10, thus the arm 20 is also rotatable relative to the first joint 10. The latching rims 322 of the pivot shaft positioner 32 have radial elasticity, thus the prong 323 of the latching rims 322 are able to be pressed down along the radial direction of the grasping shaft 32 and can also rebound to an original position. When an external force is applied to the arm 20, the teeth 211 of the arm 20 will press the prongs 323 of the latching rims 322 into the first joint receiving holes 314 of the pivot shaft 31, thus the arm 20 is rotated. With no external force on the arm 20, each of the prongs 323 of the latching rims 322 retains between two adjacent teeth 211 of the arm 20, thus the arm 20 can stably retain a position relative to the first joint 10. In addition, each of the prongs 323 can retain between any two adjacent teeth 211 of the arm 20, thus the arm 20 can stably retain at several different positions relative to the first joint 10.

The second joint 40 engages with the ball 22, thus the second joint 40 is able to rotate relative to the arm 20. Frictional force produced between the concave inner surfaces 501 of the first and second half sockets 50 and the ball 22 of the arm 20 can make the second joint 40 retain a stable position relative to the arm 20. It should be understood that, the range for rotating the second joint 40 is determined by the size of the restricting hole 413 of the second joint 40. If the size of the restricting hole 413 is relative large, the second joint 40 is able to be swung or rotated in a relatively large range. Otherwise, if the size of the restricting hole 413 is relatively small, the second joint 40 is able to be swung or rotated in a relatively small range.

In alternative embodiments, the arm 20 is directly fixed to a part of a mechanical device by one of means of melting, rivet, or glue. In addition, the arm 20 can also be made integrally with a part of a mechanical device. In that case, the ball 22, the second joint 40, and the first and second half sockets 50 are omitted accordingly.

Figure 7:
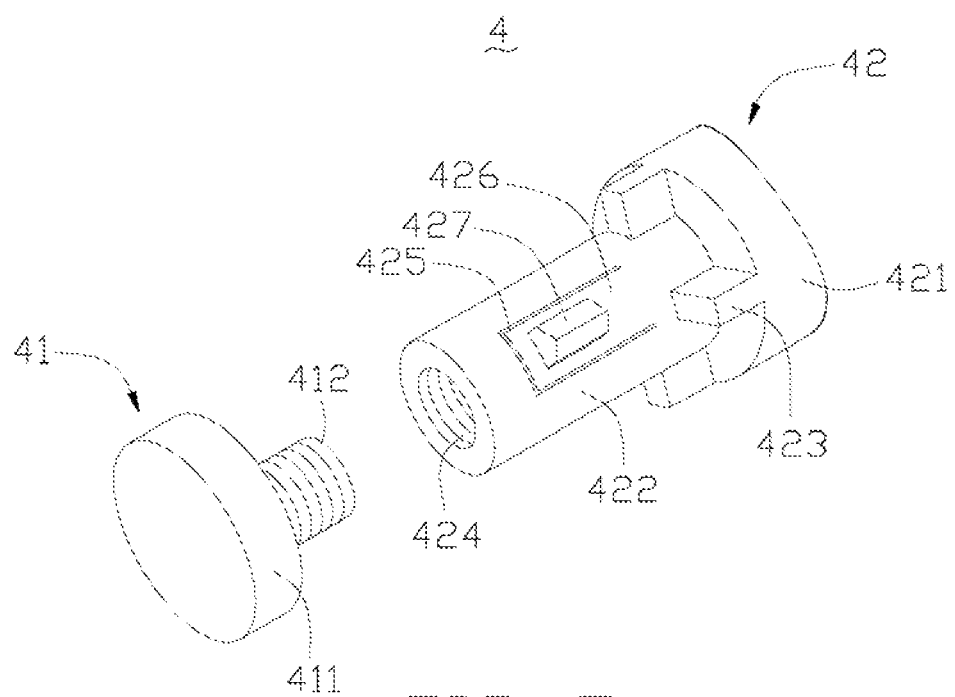
FIG. 7 is isometric view of an engaging member of a mechanical double joint system in accordance with a second embodiment of the present invention.

Referring to FIG. 7, an engaging member 4 according to a second embodiment is shown. The engaging member 4 includes a fixing member 41 and a pivot shaft 42. The pivot shaft 42 includes a shaft head 421, a shaft portion 422 extending from an end of the shaft head 421, and four latching rims 423. The latching rims 423 circle an end of the shaft portions 422 and are connected to an end of the shaft head 421. The shaft portion 422 defines a threaded hole 424 in an end opposite to the shaft head 421 and at least one U-shaped groove 425 in a middle portion thereof. The U-shaped groove 425 communicates with the threaded hole 424, thereby forming an elastic plate 426 connecting to the shaft portion 422. The elastic plate 426 includes a prong 427 extending from an outer surface of the elastic plate 426. The fixing member 41 includes a shaft head 411 and a thread portion 412 extending from an end of the shaft head 411. The threaded portion 412 is configured to screw into the threaded hole 424.

The pivot shaft 42 and the fixing member 41 are assembled to a first joint from two end of a pivot hole of the first joint. The fixing member 41 is fixed to the pivot shaft 42 with the threaded portion 412 screwed into the threaded hole 424 of the pivot shaft 42. The pivot shaft 42 is fixed relative to the first joint when the latching rims 423 are received in locking grooves of the first joint. The shaft portion 422 is received in a pivot hole of an arm and the prong 427 of the shaft portion 422 engage between two adjacent teeth of the arm.

Because the elastic plate 426 has elasticity, thus the elastic plate 426 is able to be compressed along the radial direction of the shaft portion 422 and can also rebound to an original position. When an external force is applied to the arm, teeth of the arm will press the prongs 427 of the elastic plate 426 downwards, thus the arm is rotated. When the external force is canceled from the arm, the prong 427 of the shaft portion 422 retains between two adjacent teeth of the arm, thus the arm can retain a stable position relative to the first joint.

Figure 8:
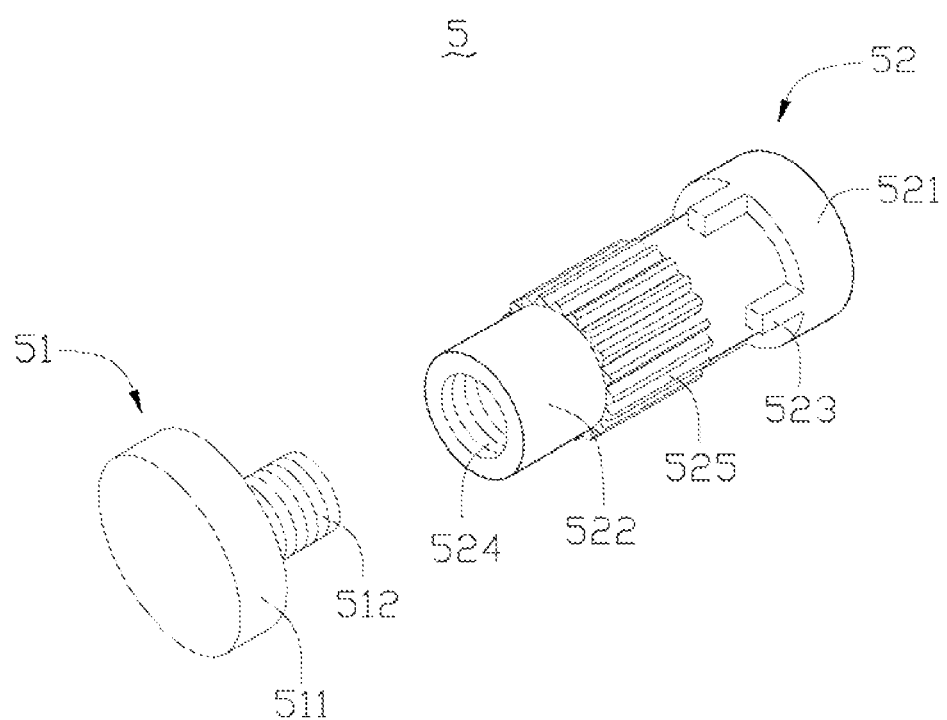
FIG. 8 is isometric view of an engaging member of a mechanical double joint system in accordance with a third embodiment of the present invention.

Referring to FIG. 8, an engaging member 5 according to a third embodiment is shown. The engaging member 5 includes a pivot shaft 52 and a fixing member 51. The pivot shaft 52 includes a shaft head 521, a shaft portion 522 extending from an end of the shaft head 521, and four latching rims 523. The latching rims 523 circles an end of the shaft portions 522 and are connected to an end of the shaft head 521. The shaft portion 522 defines a threaded hole 524 in an end opposite to the shaft head 521. The shaft portion 422 includes a plurality of teeth 525 extending from a middle portion thereof. The fixing member 51 includes a shaft head 511 and a thread portion 512 extending from an end of the shaft head 511. The threaded portion 512 is configured to screw into the threaded hole 524.

The pivot shaft 52 and the fixing member 51 are assembled to a first joint from two end of a pivot hole of the first joint. The fixing member 51 is fixed to the pivot shaft 52 with the threaded portion 512 screwed into the threaded hole 524 of the pivot shaft 52. The pivot shaft 52 is fixed relative to the first joint when the latching rims 523 are received in locking grooves of the first joint.

Figure 9:
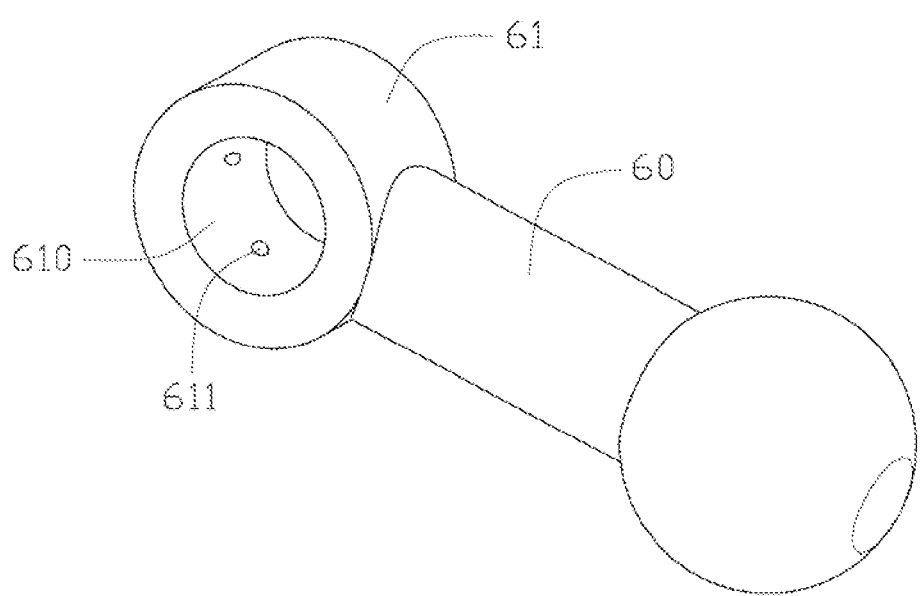
FIG. 9 is isometric view of an arm of the mechanical double joint system in accordance with the third embodiment of the present invention.

Referring to FIG. 9, an arm 60 according to the third embodiment is shown. The arm 60 is substantially a shaft including a pivot portion 61 and a ball (not labeled) opposite to the pivot portion 61. The pivot portion 61 defines a pivot hole 610 in a center thereof. The pivot portion 61 further includes a plurality of latching elements 611 mounted in the pivot hole 610.

Figure 10:
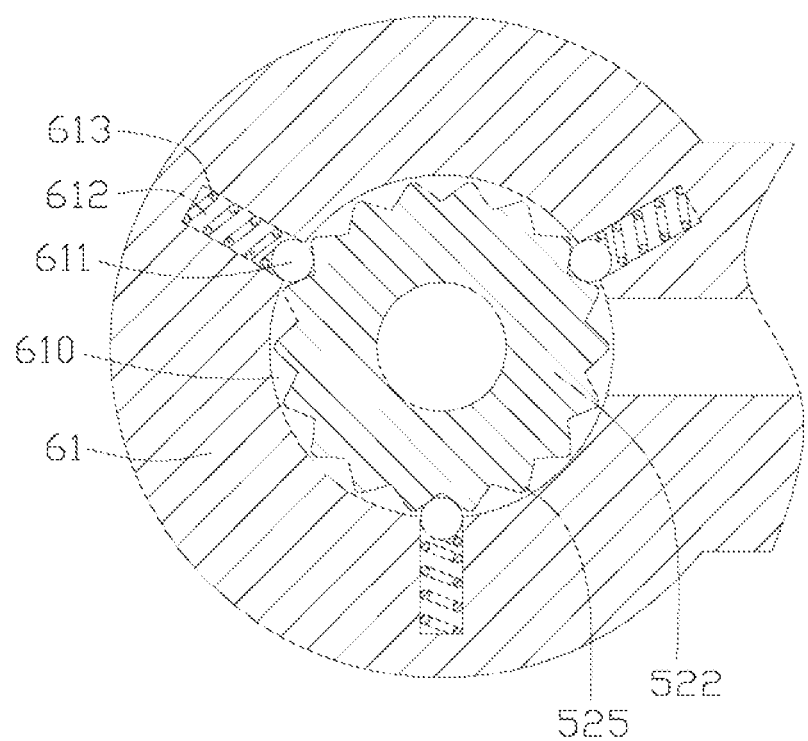
FIG. 10 is partially, cross-sectional view of the engaging member engaging with the arm of the mechanical double joint system in accordance with the third embodiment of the present invention.

Referring to FIG. 10, the pivot portion 61 defines a plurality of non-through holes 612 in an inner surface of the pivot hole 610. Each of the latching elements 611 is a steel ball received in a non-through hole 612 of the pivot portion 61. A compressed spring 613 is also received in each of the non-through hole 612. An end of the compressed spring 613 is fixed to a bottom surface of the non-through hole 612 and an opposite end of the compressed spring 613 is fixed to a latching member 611.

Each of the latching elements 611 is able to be pressed into one of the non-through holes of the pivot portion 61 and can also be rebounded to an original position by the compressed spring 613. When an external force is applied to the arm 60, each of latching elements 611 is pressed into one of the non-through holes of the pivot portion 61, thus the arm 60 is able to be rotated. When the force is canceled from the arm 60, each of latching elements 611 retains between two adjacent teeth of the arm, thus the arm 60 can retain a stable position relative to the first joint.

It should be understood that, the mechanical double joint system 100 is not limited to use for mechanical device, it can also be used for connecting an actuating portion and a supporting portion of other similar devices.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A mechanical joint system, comprising:
 a first joint defining a pivot hole and a joint receiving hole communicating with the pivot hole;
 an arm being rotatable relative to the joint, the arm comprising a pivot portion and a pivot hole defined in the pivot portion, the pivot portion being received in the joint receiving hole, and the pivot hole of the arm and the pivot hole of the joint being aligned along a same axis;
 an engaging member comprising a pivot shaft and a fixing member, the pivot shaft comprising a shaft head and a shaft portion extending from an end of the shaft head, the shaft head being inserted into the pivot hole from an end thereof, the fixing member being inserted into the pivot hole from an opposite end thereof, and fixed relative to the pivot shaft;

a plurality of teeth extending from an outer surface of the shaft portion of the pivot shaft;

wherein the first joint further comprises a first flange portion and a second flange portion formed in the pivot hole, the first flange portion is positioned adjacent to a first sidewall in the first joint receiving hole and the second flange portion is positioned adjacent to a second opposite sidewall in the first joint receiving hole; a plurality of locking grooves are defined in the second flange portion; the pivot shaft of the engaging member further comprises a plurality of latching rims circling an end of the shaft portion and connected to an end of the shaft head, and the pivot shaft is fixed relative to the first joint when the latching rims received in locking grooves of the first joint; and the arm defines at least one non-through hole in an inner surface of the pivot hole, the latching member is a steel ball received in the at least one non-through hole for engaging with the teeth, the mechanical joint system latching member further comprises at least one compressed spring received in the at least one non-through hole, an end of the at least one compressed spring is fixed to a bottom surface of the at least one non-through hole and an opposite end of the at least one compressed spring is fixed to the latching member.

2. The mechanical joint system as claimed in claim 1, wherein the shaft portion of the pivot shaft defines a threaded hole in an end opposite to the shaft head of the pivot shaft, the fixing member comprises a shaft head and a threaded portion extending from an end of the shaft head, and the fixing member is fixed to the pivot shaft with the threaded portion engaged in the threaded hole of the pivot shaft.

3. The mechanical joint system as claimed in claim 1, wherein the plurality of teeth extend from a middle portion of the shaft portion of the pivot shaft of the engaging member.

4. The mechanical joint system as claimed in claim 1, further comprising a second joint, the second joint comprising a first half and a second half attached to the first half, the arm further comprising a ball opposite to the pivot portion to rotatably engage in the second joint.

5. The mechanical joint system as claimed in claim 4, wherein the first half comprises a plurality of cylindrical poles extending from an inner surface thereof, each of the cylindrical poles defines a circular hole therein, the second half includes a plurality of latching poles extending from an inner surface thereof, each of the latching poles has a size corresponding to one of the circular holes, and the first half is attached to the second half by inserting the latching poles into the circular holes correspondingly.

6. The mechanical joint system as claimed in claim 4, further comprising a pair of first and second half sockets, each of the first and second half sockets comprising a concave inner surface, the first and second half sockets being fixed to the first half and the second half correspondingly, and the concave inner surfaces being oriented symmetrically opposite to each other to cooperatively clamp the ball of the arm.

7. A mechanical joint system, comprising:

a first joint defining a pivot hole and a joint receiving hole communicating with the pivot hole;

an arm being rotatable relative to the joint, the arm comprising a pivot portion and a pivot hole defined in the pivot portion, the pivot portion being received in the joint receiving hole, at least one non-through hole being defined in an inner surface of the pivot hole, and the pivot hole of the arm and the pivot hole of the joint being aligned along a same axis;

an engaging member comprising a pivot shaft and a fixing member, the pivot shaft comprising a shaft head and a shaft portion extending from an end of the shaft head, the shaft head being inserted into the pivot hole from an end thereof, the fixing member being inserted into the pivot hole from an opposite end thereof, and fixed relative to the pivot shaft;

a plurality of teeth extending from an outer surface of the shaft portion of the pivot shaft; and at least one latching member comprising a steel ball and a compressed spring, the at least one steel ball being received in the at least one non-through hole for engaging with the teeth, the at least one compressed spring being received in the at least non-through hole, and the at least one compressed spring being connected to a bottom surface of the at least one non-through hole and the at least one steel ball.

* * * * *